US009042813B2

(12) United States Patent
Milhorn et al.

(10) Patent No.: US 9,042,813 B2
(45) Date of Patent: May 26, 2015

(54) DYNAMIC CONTROL POINT IN SIMULCAST RADIO COMMUNICATION SYSTEM

(71) Applicant: HARRIS CORPORATION, Melbourne, FL (US)

(72) Inventors: Joseph J. Milhorn, Forest, VA (US); David William Brown, Concord, VA (US)

(73) Assignee: Harris Corporation, Melbourne, FL (US)

( * ) Notice: Subject to any disclaimer, the term of this patent is extended or adjusted under 35 U.S.C. 154(b) by 169 days.

(21) Appl. No.: 13/911,494

(22) Filed: Jun. 6, 2013

(65) Prior Publication Data
US 2014/0364161 A1    Dec. 11, 2014

(51) Int. Cl.
H04B 7/14       (2006.01)
H04W 24/04      (2009.01)
H04W 4/06       (2009.01)
H04H 20/67      (2008.01)
H04L 1/22       (2006.01)
H04W 84/04      (2009.01)
H04H 20/12      (2008.01)

(52) U.S. Cl.
CPC .............. H04W 24/04 (2013.01); H04W 4/06 (2013.01); H04H 20/67 (2013.01); H04L 1/22 (2013.01); H04W 84/042 (2013.01); H04H 20/12 (2013.01)

(58) Field of Classification Search
CPC ... H04W 36/026; H04W 60/00; H04W 28/04; H04W 84/08; H04L 41/0672
USPC ................................. 455/464, 13.3, 16, 562.1
See application file for complete search history.

(56) References Cited

U.S. PATENT DOCUMENTS

| 5,448,758 | A  | 9/1995 | Grube et al.    |
|-----------|----|--------|-----------------|
| 7,092,730 | B2 | 8/2006 | Eberlein et al. |
| 7,649,893 | B2 | 1/2010 | Nisbet          |

FOREIGN PATENT DOCUMENTS

WO    2011/018537 A1    2/2011

OTHER PUBLICATIONS

International Search Report issued Sep. 1, 2014 in connection with International Patent Appln. No. PCT/US2014/040200 to Harris Corporation (11 pages).
EF Johnson Technologies, "Simulcasting Project 25" Apr. 1, 2013, XP055138394, Retrieved from the Internet: URL: http://www.efjohnsontechnologies.com/resources/dyn/files/972772z218319c9/_fn/Simulcasting Project 25.pdf (retrieved on Sep. 5, 2014) (16 pages).

Primary Examiner — Tu X Nguyen
(74) Attorney, Agent, or Firm — Robert J. Sacco, Esq.; Fox Rothschild LLP

(57) ABSTRACT

Simulcast communication network (200) includes a first transmit/receive (T/R) site ($210_1$, $210_2$, ... $210_N$) that functions as control point. At least one processing device (211) is communicatively coupled to the simulcast communication network. The at least one processing device is responsive to a determination that the first T/R site has experienced at least one fault to initiate a dynamic control point arbitration (DCPA) session. The DCPA session includes automatically selecting one of a plurality of second T/R site ($210_1$, $210_2$, ... $210_N$) to function as the control point in place of the first T/R site and automatically re-configuring of the simulcast communication network to cause the selected one of the plurality of second T/R sites to function as the new control point.

19 Claims, 5 Drawing Sheets

DYNAMIC CONTROL POINT IN SIMULCAST RADIO COMMUNICATION SYSTEM

BACKGROUND OF THE INVENTION

1. Statement of the Technical Field

The inventive arrangements relate to communication systems, and more particularly to fault tolerant simulcast communication systems.

2. Description of the Related Art

In a simulcast communication system, multiple remote transmit sites operate under the command of a common control point. The centralized control point serves as a single source of data for N time-synchronized transmit sites. More particularly, the control point causes each transmit site to broadcast the same signal, on the same RF frequency, at substantially the same time. This arrangement allows a simulcast communication system to provide reliable communication over a broader geographic area than would otherwise be possible with a single transmitting station. The function and nature of control points in simulcast systems is such that they are generally based on a centralized point-to-multipoint architecture.

Simulcast communication systems generally must include some way for the control point to communicate with the N time synchronized transmit sites. Packet-based computer networks can be used for this purpose, as is disclosed in U.S. Pat. No. 7,092,730. Packet-based computer networks tend to be fault tolerant, which is advantage in a communication used by public service personnel and first responders. Because the control point is a key component in any simulcast communication system, designers frequently take steps to improve the reliability of such equipment. Accordingly, a control point will often include redundant hardware which can serve as a back-up in case a component or sub-system at the control point experiences a fault. Some systems have extended this concept to include completely redundant control point systems at different geographic locations. Such redundant control points can enhance system resiliency, but they add cost and increase system complexity.

SUMMARY OF THE INVENTION

Embodiments of the invention concern a simulcast communication network which includes a first transmit/receive (T/R) site configured to function as a control point. The first T/R site receives data from a plurality of sources and communicates common transmission data to a plurality of second T/R sites. At least one RF transmitter system is respectively provided at each of the first T/R site and at each of the plurality of second T/R sites. Each RF transmitter at a T/R site is configured to synchronously transmit the common transmission data on a same RF frequency. At least one processing device is communicatively coupled to the simulcast communication network. The at least one processing device is responsive to a determination that the first T/R site has experienced a fault to initiate a dynamic control point arbitration (DCPA) session. The DCPA session includes automatically selecting one of the second T/R sites to function as the control point in place of the first T/R site. The DCPA session also includes initiating an automatic re-configuring of the simulcast communication network to cause the selected one of the plurality of second T/R sites to function as the new control point for the simulcast communication network in place of the first T/R site.

The invention also includes a method for operating a simulcast communication network as described above. The method generally involves communicating common transmission data from a first T/R site functioning as a control point to a plurality of second T/R sites, and synchronously transmitting the common transmission data from each of the first T/R site and the plurality of second T/R sites on a same RF frequency. Responsive to a determination that the first T/R site has experienced at least one fault, the method can further involve automatically selecting one among the plurality of second T/R sites to function as the control point in place of the first T/R site. Once the new control site has been selected in this way, the simulcast communication network is automatically reconfigured to use the selected one of the second T/R sites as the control point in place of the first T/R site.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 1:
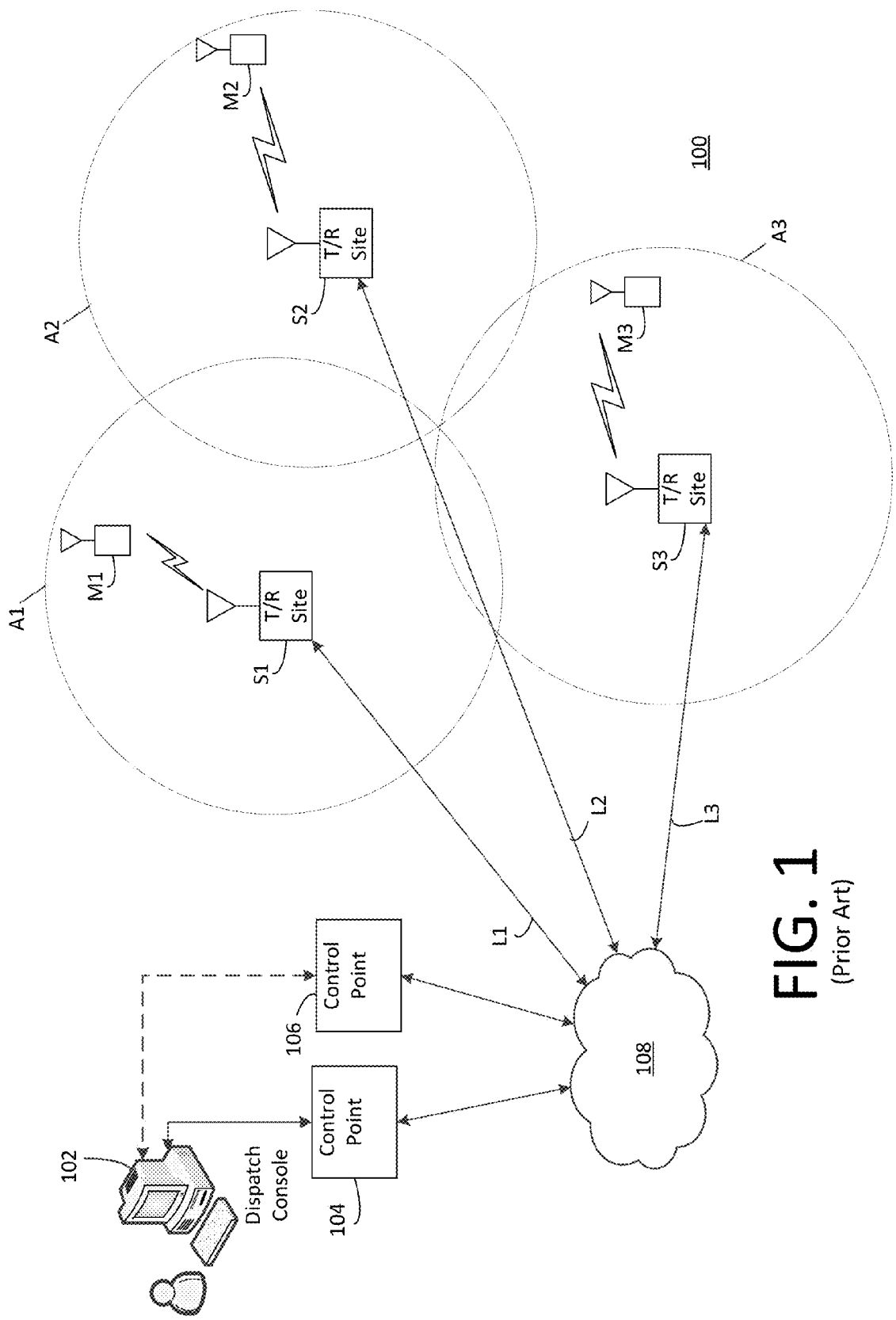
FIG. 1 is a conceptual diagram of a simulcast communication system.

Referring now to FIG. 1 there is shown a typical simulcast type RF communication system 100. Simulcast RF systems are well known in the art and therefore will not be described here in detail. However, a brief overview of the operations of simulcast system 100 shall be provided for aiding in the understanding of the inventive arrangements. The communication system 100 includes three simulcasting transmit/receive sites (T/R sites) S1, S2 and S3. The transmissions of each site cover a predetermined geographic coverage area. For example, the T/R site S1 can cover area A1, T/R site S2 can cover area A2, and the T/R site S3 can cover area A3. A central control point 104 is communicatively coupled to each of the T/R sites S1, S2 and S3 by means of a communication network 108, which may be a packet based communication network. A dispatch console 102 is communicatively linked to the control point 104.

The control point 104 communicates substantially identical signals to each of the T/R sites where the signals are synchronously transmitted on the same RF frequency to one or mobile radio units within the coverage areas A1, A2 and/or A3. A mobile unit M1, M2 and/or M3 can receive such outbound transmissions from a T/R site. As an example, a communication signal can originate with a dispatch console 102 and can be forwarded to the control point 104. The signal can be communicated from the control point to each of the T/R sites S1, S2, and S3. The communication can then be synchronously transmitted from each of the T/R sites. As known in the art, the signals from each site are transmitted at substantially the same time, with appropriate timing offsets applied so as to minimize time delay interference.

The exemplary system described herein provides a digital control channel and a plurality of working channels. Accordingly, a request to communicate can be sent from the mobile unit (e.g. mobile unit M3) by transmitting a channel assignment request to a T/R site (e.g. T/R site S3) on an inbound control channel. When the channel assignment request is received by the T/R site, it is communicated to control point 104. The control point 104 responds by causing a control channel assignment message to be simultaneously transmitted using T/R sites S1, S2 and S3. The control channel assignment message is received by the mobile unit M3 (and any other mobile units that are "called" by that channel assignment. The mobile unit M3 and any other called mobile units respond to the channel assignment message by transitioning to a working RF frequency. The called radios then communicate using the working frequency until the termination of the communication session.

During a communication session, transmissions from a mobile unit (e.g. mobile unit M3) will be received at one or more of the T/R sites S1, S2 and S3. When received, each of these transmission is forwarded to the control point 104, where the signal with the best signal to noise ratio is selected. That signal is then communicated back to each of the T/R sites where it is rebroadcasted by each of the T/R sites so that it may be heard by other mobile units within coverage areas A1, A2 and/or A3. Upon completion of the communication session, the various mobile radios return to a state in which they continue to monitor the outbound control channel for additional control messages.

In order to prevent time delay interference, identical transmissions emanating from T/R sites S1, S2 and S3 must be time synchronized. The timing of each transmission is precisely adjusted relative to the other transmission so as to minimize time domain interference. Various techniques are available for implementing such time synchronization. For example, a simulcast system architecture can use a global positioning system (GPS) satellite receiver at each T/R site for providing access to a common timing reference. Other systems for maintaining system timing are also possible.

In a simulcast system such as system 100, a known failure mode can include the occurrence of a fault in control point 104. In such a scenario, a redundant control point 106 can be used to perform the functions of control point 104. Redundant control point 106 can communicate with the T/R sites S1, S2 and S3 using the communication network 108. Although the transition from control point 104 to redundant control point 106 can be useful, it also involves several limitations. The primary drawback of the prior art implementation of redundant control points is the cost of the additional control point site. This leads to generally not implementing a backup or only having a single backup. In contrast, the invention as hereinafter described will allow any transmit site to be a backup for the control point. In a targeted attack, the system shown in FIG. 1 could be disabled by taking out the one or two control points. Conversely, with the invention disclosed herein, all of the transmit sites would need to be disabled in order to prevent the system from functioning.

Figure 2:
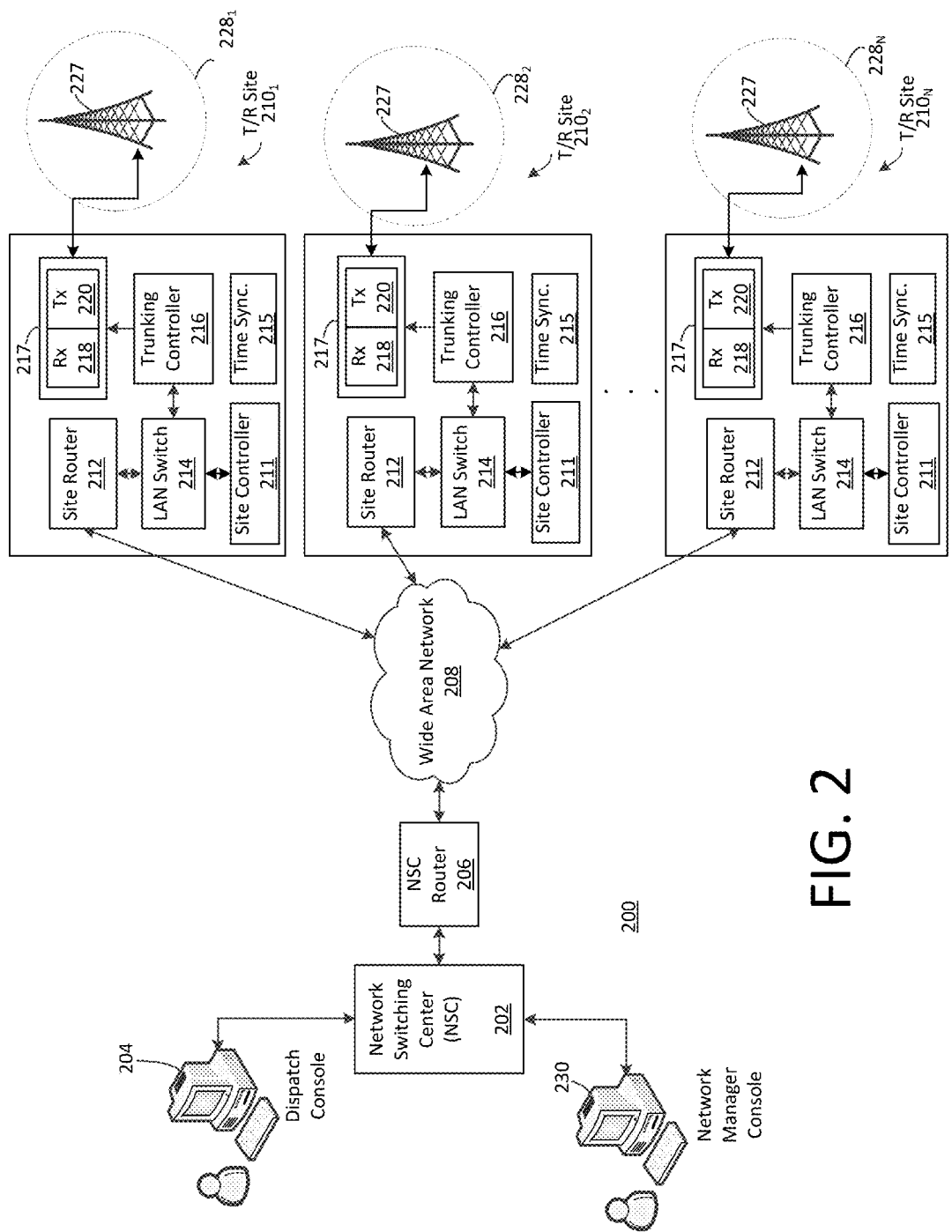
FIG. 2 is a block diagram of a simulcast communication system that is useful for understanding the invention.

Referring now to FIG. 2, there is shown an exemplary simulcast communication system 200. The communication system 200 provides enhanced features for avoiding certain problems associated with conventional types of redundant control point arrangements as outlined above. According to one aspect of the invention, the system 200 is a digitally trunked simulcast communication system. For example, the system 200 can function in a manner similar to the EDACS simulcast system, using a control channel and a plurality of working channels.

System 200 includes a plurality of T/R sites $210_1$, $210_2$, . . . $210_N$, a dispatch console 204, a network manager console 230 and a network switching center 202. A wide area network 208 is used to connect the various components as shown. Each T/R site (or a subset of the T/R sites) has the ability to be both a control point and a remote transmit/receive site at the same time, thereby allowing for up to N−1 redundant control point sites. When the T/R site serving as the control point experiences a fault affecting its operation as the control point, or a fault with respect to a number of functional transmit/receive channels, then it will alert the other T/R sites with a suitable notification. The T/R sites $210_1$, $210_2$, . . . $210_N$ will then autonomously and dynamically choose a different one of the T/R sites to act as the control point. Thereafter, each of the functioning T/R sites will reconfigure its behavior to facilitate simulcast operations in a new or rebuilt system wherein the selected one of the T/R sites assumes the functions of the control point. At each T/R site, predefined failure or fault limits are established to determine the point at which the particular T/R site should be removed as the control point. When those limits are exceeded, the T/R site will alert the other T/R sites and trigger a system re-build as described herein. Once a different T/R site is selected, that selected T/R site will thereafter be used as the control point.

Each T/R site selected as the control point will perform all of the functions normally handled by a control site in a simulcast system as described herein. For example, the selected T/R site functioning as control point will communicate in real time substantially identical signaling (including digital control channel signaling and associated timing information) for transmission by the various T/R sites. The T/R site functioning as control point system also evaluates received signals from mobile radio units (as provided by each of the other T/R sites), and will select the received signal with best signal to noise ratio. The T/R site functioning as control point will forward the selected signal to each of the other T/R sites for re-transmission. The T/R site functioning as control point will also communicate the selected signal (having the best signal-to-noise ratio) to a network switching center 202. The network switching center will direct the received voice data communication to the dispatch console 204.

Each of the T/R sites $210_1$, $210_2$, . . . $210_N$ includes several components for facilitating a digitally trunked simulcast communication system 200. For example, each T/R site advantageously includes a site router 212, a LAN switch 214, trunking controller 216, and an RF transceiver 217. Routers and LAN switches are well known in the art and therefore will not be described here in detail. However, it will be appreciated that site router 212 can receive packetized data communications from LAN switch 214 and from the wide area network and route such packetized communications to an appropriate network destination address. LAN switch 214 directs packetized data communications received by the T/R site to the site router 212, to one or more trunking controllers 216 and/or to site controller 211.

The RF transceiver 217 will include a radio receiver 218 and radio transmitter 210. The radio receiver 218 and transmitter 210 are advantageously configured for receiving and transmitting RF signals in accordance with a predefined air interface protocol selected for communicating with mobile radio units. For example, the transceiver 218 can be configured for implementing an air interface consistent with a conventional Project P25 (P25) communication protocol. The phrase Project 25 or P25, as used herein, refers to a set of system standards produced by the Association of Public Safety Communications Officials International (APCO), the National Association of State Telecommunications Directors (NASTD), selected Federal Agencies and the National Communications System (NCS). The P25 set of system standards generally defines digital radio communication system architectures capable of serving the needs of Public Safety and Government organizations. Of course, the invention is not limited to use with P25 type communication systems and other air interfaces can also be used for this purpose. For example, the air interface protocol implemented by a particular RF transceiver 217 can be based on the Enhanced Digital Access Communications System ("EDACS"), OPENSKY, or Terrestrial Trunked Mobile Radio ("TETRA"). Each of these different systems typically include a specific voice encoder ("vocoder") and have different encryption schemes. For example, a P25 system typically uses an Improved Multi-Band Excitation ("IMBE") vocoder with Data Encryption Standard ("DES") or Advanced Encryption Standard ("AES") encryption while an OPENSKY system typically uses an Advanced Multi-Band Excitation ("AMBE") vocoder with AES encryption.

Each T/R site $210_1, 210_2, \ldots 210_N$ will generally include one or more antennas 227 for communicating with mobile radio units (not shown in FIG. 2) in a respective communication coverage area $228_1, 228_2, \ldots 228_N$. The trunking controller 216 at each T/R site is configured to facilitate trunked radio communications with mobile units in accordance with a trunked radio communication system protocol. Accordingly, communication sessions can in certain embodiments be instantiated using a control channel and can thereafter be maintained using one or more working channels. Trunking controllers are well known in the art and therefore will not be described here in detail. Each of the T/R sites can also include a site controller 211. The site controller 211 is a custom or general purpose computer processing device which is configured for controlling the operation of a particular T/R site as described herein. According to some embodiments, the site controller 211 can be configured to implement one or more control point functions for those occasions when a particular T/R site $210_1, 210_2, \ldots 210_N$ is selected to function as the control point for system 200. In some embodiments the site controller functions are performed by one or more of the trunking controllers 216.

Each T/R site maintains time synchronization with the other T/R sites by means of a time synchronization unit 215. In some embodiments, the time synchronization unit 215 can include a global positioning system (GPS) satellite receiver for providing access to a common timing reference. GPS based time synchronization systems for simulcast communications are well known in the art and therefore will not be described here in detail. Other systems for maintaining time synchronization are also possible, and time synchronization units 215 can utilize any synchronization method now known or known in the future for purposes for synchronizing simulcast transmissions.

T/R sites $210_1, 210_2, \ldots 210_N$ communicate with network switching controller (NSC) 202 and other T/R sites by means of a suitable communication network, such as a wide area network 208. According to one aspect, wide area network 208 is advantageously selected to be a packet switched data network. Accordingly, when a T/R site needs to communicate, it does so by transmitting one or more data packets which include header information specifying the network address of a recipient node within the network 200. The network address may be a network address of a particular T/R site, NSC 202, or any other networked device associated with the communication network 200. A dispatch console 204 is communicatively coupled to the wide area network 208 by means of the NSC 202 and an NSC router 206. The dispatch console 204 facilitates communications between a dispatch operator and mobile radio units (not shown) in coverage areas $228_1, 228_2, \ldots 228_N$.

A voice communication originating at dispatch console 204 is packetized and communicated to a particular T/R site $210_1, 210_2, \ldots 210_N$ which has been designated as control point. For example, this communication can be accomplished by including with each packet a network destination address associated with the particular T/R site that has been designated as the control point. The data packets are communicated from dispatch console 204 to NSC 202. The packets are then communicated through NSC router 206 and wide area network 208, to finally arrive at the particular T/R site which is designated as control point. Once received at the control point T/R site, the content of the data packets containing the voice communication are processed by site controller 211 or some other computer processing entity at the T/R site to determine the proper action. The T/R site will then communicate the voice content of the data packets and any necessary timing references to each T/R of the T/R sites $210_1, 210_2, \ldots 210_N$ for transmission. The data packets can be communicated to the other T/R sites (not functioning as control point) using conventional packet communication methods in which the network address of the various T/R sites $210_1, 210_2, \ldots 210_N$ is specified as the destination address. The data packets are used at the T/R sites to generate a voice communication signal, which is then transmitted at each T/R site $210_1, 210_2, \ldots 210_N$. In accordance with simulcast communication methods, the voice communication signals are then transmitted at substantially the same time, but with small timing offsets as needed to minimize time domain interference. Accordingly, the voice communication from the dispatch operator can be received and heard by operators of mobile units within each of the coverage areas $228_1, 228_2, \ldots 228_N$.

Voice and/or data communications from a mobile unit (not shown) are received at one or more of the T/R sites $210_1, 210_2, \ldots 210_N$ and forwarded to the T/R site which has been designated as control point. The packets are communicated using conventional packet based network communications. The site controller 211 or other processing entity at the T/R site performing control point functions will compare the signal to noise ratios of the signals received at the various T/R sites and choose the signal having the best signal quality. The selected one of the signals is then communicated over the wide area network 208 from the T/R site functioning as control point system to the dispatch console 204. Conventional packet communications are used for this purpose. At the dispatch console, the packetized data is used to reproduce the voice communication from the mobile unit for the benefit of the dispatch console operator. The selected received signal from the mobile unit can also be formatted in accordance with a predetermined air interface protocol by the T/R site functioning as control point, and communicated as packetized data to each of the other T/R sites $210_1, 210_2, \ldots 210_N$. Upon arrival at each of the T/R sites $210_1, 210_2, \ldots 210_N$, the packetized data is used to assemble a voice transmission which is transmitted (simulcasted) by the T/R sites over the air. This transmission is provided so that the received signal from the mobile unit can be received by other mobile units within coverage areas $228_1$, $228_2$, ... $228_N$.

Trunking operations in system 200 can be configured in accordance with any trunking system protocol now known or known in the future for establishing a digitally trunked simulcast communication system. Accordingly, system 200 can make use of various control channels to set up calls and establish working channels as is known. Some of these trunking operations can be managed by trunking controllers 216 provided in the respective T/R sites $210_1$, $210_2$, ... $210_N$. The particular trunking protocol used is not critical to the invention.

Figure 3A:
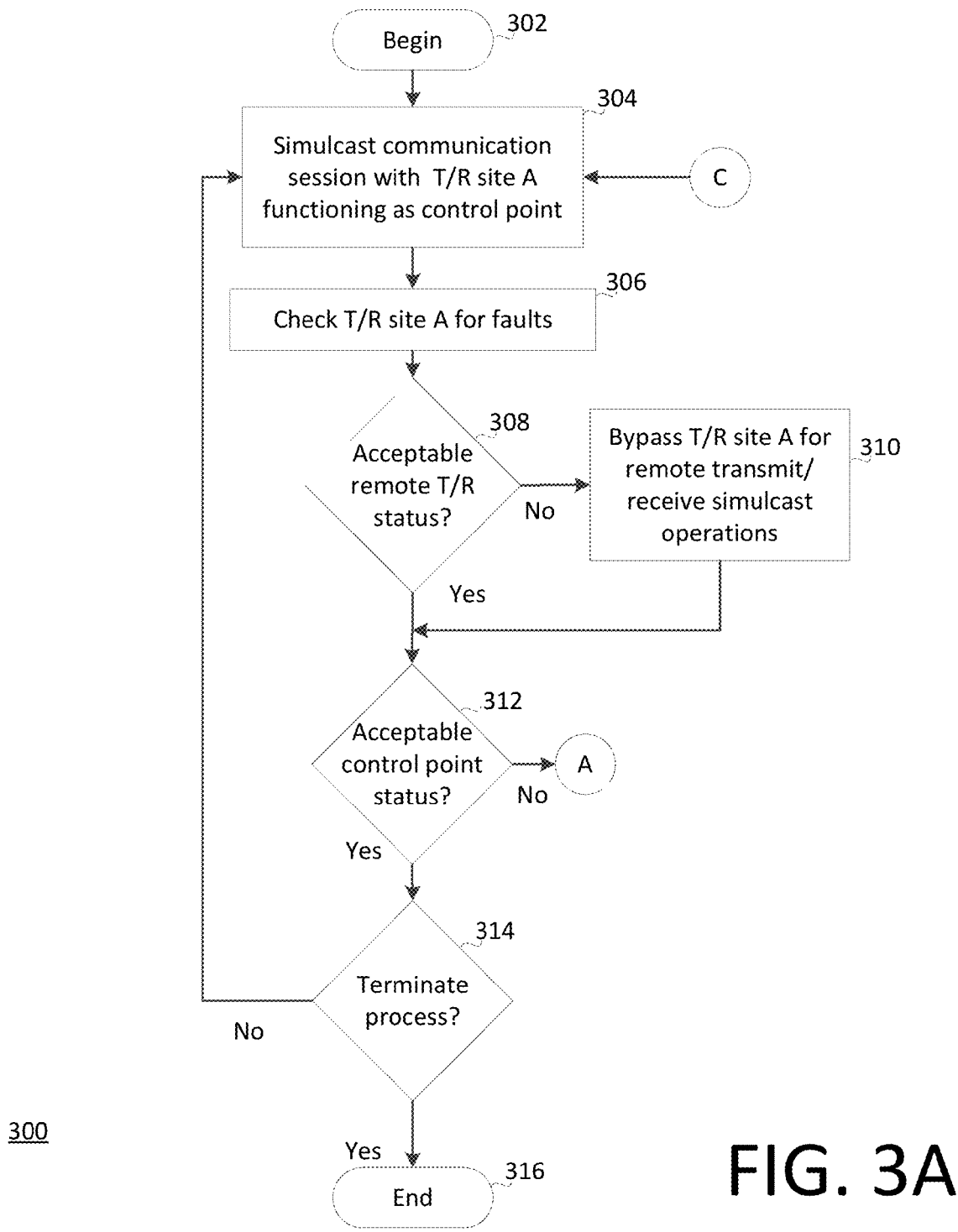
FIGS. 3A through 3B collectively provide a flowchart that is useful for understanding the invention.
Figure 3B:
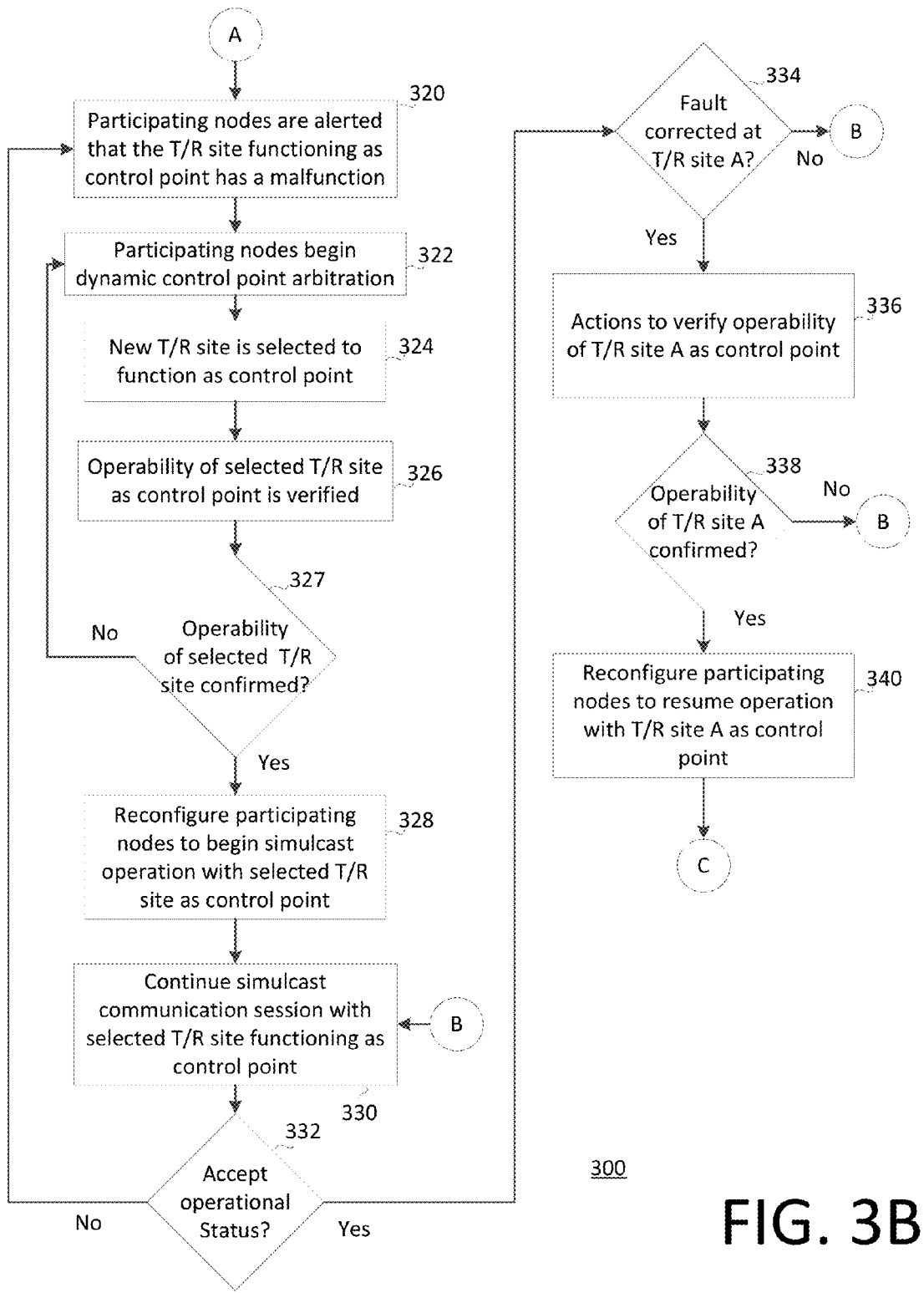

The dynamic control point method described above will be described in further detail with reference to the process 300 shown in FIG. 3. As shown in FIG. 3, the process begins at step 302 and continues on to 304 at which point a simulcast communication session is performed with a T/R site A functioning as a control point. T/R site A can be understood to include any one of the T/R sites $210_1$, $210_2$, ... $210_N$ that is capable of also functioning as a control point. The process continues on to step 306 where T/R site A is evaluated to determine the presence and/or extent of any fault condition. The check performed in step 306 can involve evaluation of various functions performed by T/R site A. The evaluated functions can include conventional remote transmit/receive functions and control point functions.

The conventional transmit/receive functions are those which facilitate the site's participation in a simulcast communication session as a remote transmit/receive site. For example, the check at 306 can include an evaluation of one or more RF communication channels implemented by the T/R site which impact its ability to communicate with one or more mobile radio units. The site check can also include evaluation of other conventional T/R site functions, relating to trunking operations, network communications, time synchronization systems, and so on. The control point functions which are checked at 306 can also include any functions that impact the T/R site's ability to carry out the functions of a control point in a simulcast communication system 200. These control site functions can include network communications capability, time synchronization functions, data processing functions, data storage capability, and so on.

The site check at 306 can be performed independently by T/R site A or such check can be performed in cooperation with one or more other nodes comprising communication network 200. For example, one or more of the other T/R sites $210_1$, $210_2$, ... $210_N$ comprising the network can evaluate the operation of T/R site A to determine whether it is functioning properly as a control point. A similar evaluation can be performed by a network node such as NSC 202. The evaluation performed by the other nodes can include a determination as to whether communications with T/R site A have been lost or interrupted. It can also include a determination that the data provided by T/R site A is faulty or contains errors.

After evaluating T/R site A at step 306, the process can continue to 308 where a determination is made as to whether the current fault status of T/R site A is acceptable for purposes of allowing T/R site A to continue functioning as a remote transmit/receive site in the ongoing simulcast communication session. As an example, a failure of one RF communication channel in a transmitter or receiver at T/R site A may have minimal affect on the remote transmit receive operations of the site. Accordingly, in such a scenario, the T/R site A may be deemed to have an acceptable fault status for purposes of remote transmit/receive operation. Conversely, if several RF communication channels have failed, or the if site is no longer able to maintain time synchronization with the remainder of the simulcast system, then T/R site A may be found unacceptable for purposes of continued operation as a remote transmit/receive site. In such an event (308: No) the T/R site A can be bypassed at 310 such that it no longer participates as a remote transmit/receive site in the ongoing simulcast communication session. Consequently, the T/R site A will no longer transmit simulcast communications with the other T/R sites.

It will be appreciated that a T/R site A may be able to substantially perform its functions as a control point while enduring certain fault conditions relating to its operation as a remote transmit/receive site. Accordingly, at 312 a determination is made as to whether a current fault status of T/R site A is acceptable for purposes of allowing the site to continue functioning as a control point. For example a failure of a router 212, LAN switch 214, site controller 211 may be deemed unacceptable, particularly if there are no suitable redundant component available at the particular T/R site A. The number and type of faults which are deemed acceptable or unacceptable for purposes of control point operation can be predetermined in advance. Also, time thresholds may be established to determine a maximum permitted period of time between when the site enters a bypass mode of operation and when the system will determine that it no longer has an acceptable fault status for purposes of continuing operations as a control point. Accordingly, a fault status for T/R site A that includes several failing transmit channels may be initially be deemed an acceptable control point status, but after some period of elapsed time may cause a determination that the control point status is no longer acceptable. The foregoing arrangement facilitates the ability to configure setup rules and/or time thresholds which can limit the amount of time between when the T/R site enters a bypass mode and when the T/R site is no longer deemed acceptable for purposes of functioning as control point.

If T/R site A has an acceptable control point fault status (312: Yes), then the process continues to 314 where a determination is made as to whether the process 300 should be finally terminated. If so (314: Yes), then the process is allowed to terminate at 316. If the process is not terminated (314: No) then it returns to 304 where T/R site A continues to function as control point.

If it is determined at 312 that the T/R site A does not have an acceptable control point status (312: No), then the process continues on to 320 at which point participating nodes in communication network 200 are alerted that the function of T/R site A is impaired. This alert can be initially generated by T/R site A or any other participating node upon determination that the operations of T/R site A have been substantially compromised with respect to its operation as a control point. The alert can also be generated by NSC 202. Once alerted to the compromised status of T/R site A, the other T/R sites $210_1$, $210_2$, ... $210_N$ of the communication system 200 begin a dynamic control point arbitration (DCPA) session at 322. During the course of the DCPA session, the T/R sites engage in processes and communications configured to result in the selection of a new T/R site at 324 which will replace T/R site A as control point.

Any suitable process or algorithm can be used for selecting a T/R site to perform control point functions. In some embodiments, the new T/R site can be selected in accordance with a pre-determined order of preference. In such a scenario, the DCPA session can involve communicating preference information from one T/R site to the remaining T/R sites, or can involve accessing a preference list stored at each site. Alternatively (or in addition thereto) the DCPA process can involve a determination as to which T/R site is best suited to take on the role of control point at a given point in time. For example, each T/R site capable of functioning as a control point can determine whether it is currently experiencing any fault conditions. A T/R site experiencing significant fault conditions may not be suitable for purposes of performing the control point function. Accordingly, the information concerning the status of each T/R site can be shared with the other sites participating in the DCPA session. Also, T/R sites may be assigned a weighting reflecting or indicating a degree of preference specified by a system manager with respect to the use of each such site as a control point. Finally, one or more of the T/R sites may not have the necessary hardware resources or may not be otherwise configured to function as a control point site. These sites will communicate to the other sites that they are not capable of functioning as control point, or will simply not participate in the DCPA session.

The various T/R sites $210_1, 210_2, \ldots 210_N$ can evaluate the information they have received from the other T/R sites, each applying the same algorithm, to select one T/R site which will take on the responsibility for control point functions. Alternatively, the evaluation can be performed by one T/R site and the resulting selection information can be communicated to the other T/R sites. As a further alternative, the information concerning the suitability of each T/R site can be communicate to a separate processing facility such as NSC 202. The separate processing facility will then select the T/R site to act as control point and communicate this information to the T/R sites.

Once a T/R site has been selected at 324, the operability of the selected T/R site as control point can be optionally verified at 326 and 327. This can involve communication of test data to the selected T/R site or any other steps which are appropriate to ensure that the T/R site is ready to accept responsibility for the control point function. If operability is not confirmed (327: No) then a new DCPA session can be initiated at 322. If operability is confirmed (327: Yes) then the process continues to 328 at which point the entire network 200 is dynamically re-configured so that participating nodes can begin simulcast operations with the selected T/R site as the new control point. This reconfiguration process will generally involve several steps. For example, reconfiguration can involve updating one or more tables maintained by the various nodes comprising the communication system 200 to specify new destination address information for various communications. The NSC 202 will need to update the destination address for communications originating in dispatch console 204 to specify the newly selected T/R site which will henceforth perform control point functions. Similarly, each of the T/R sites will need to update destination address information to specify the newly selected T/R site for purposes of communicating received voice and data communications. The T/R site selected as the new control point will initiate any software applications necessary for implementing control point functions and will prepare to begin receiving data packets from NSC 202 and the remaining T/R sites $210_1, 210_2, \ldots 210_N$.

At a predetermined time, which can be specified by the DCPA session, the system will automatically begin a new simulcast communication session at 330. It will be appreciated that in certain embodiments of the present invention, the reconfiguration at 328 can occur in the background concurrently while the prior simulcast communication session is still in progress using T/R site A as the control point. Accordingly, when the transition to the newly selected control point does in fact occur, such transition can be substantially seamless, with all nodes transitioning as the same predetermined time. Still, the invention is not limited in this regard, and in some embodiments, a momentary cessation of the first simulcast communication session can occur while the system is reconfigured for the new communication session.

Following transition to the new session at 330, the process continues at 332 where the T/R site selected as control point can be periodically evaluated to determine its operational status, including detection of any fault conditions. This process can be similar to the process described above with respect to steps 306-312. If a critical fault is detected which indicates that the selected T/R site no longer has an acceptable operational status (332: No), then the process returns to 320 to once again select a new T/R site to perform control point functions.

If the operational status of the selected T/R site is acceptable (332: Yes) then the new simulcast session can simply continue with the selected T/R site functioning as control point. However, in some scenarios it may be preferable to eventually return control point responsibility to T/R site A. Accordingly, the process can continues on to 334 where a determination is automatically made as to whether the faults associated with T/R site A have been corrected. This determination can be made based on a periodic communication from the selected T/R site directed to T/R site A to determine its status. Alternatively, T/R site A can automatically generate a notification when it has recovered from a fault condition. According to another aspect, a system administrator can send a message to one or more nodes of communication network 200 to inform them that T/R site A is once again fully operational.

If the fault conditions at T/R site A have not been addressed (334: No) the process returns to 330 where the simulcast session continues with the selected T/R site functioning as control point. If the fault conditions at T/R site A have been resolved (334: Yes) the process continues to step 336 where actions are taken to verify the operability of T/R site A as control point. The process then continues to 338 where a determination is made as to whether the operability of T/R site A has been confirmed. If not (338: No) then the process returns to 330 where the simulcast session continues with the selected T/R site functioning as control point. However, if the operability of T/R site A is confirmed (338: Yes), then the process continues on to 340 where the various nodes participating in the network are dynamically re-configured to resume operation with T/R site A as control point. Thereafter, the process can return to 304 where a new simulcast communication session can begin with T/R site A again functioning as control point.

It is contemplated that the processes described in relation to FIG. 3 will allow a communication system 200 to automatically and dynamically choose different T/R sites as the control point as the need arises. Still, it will be appreciated that a system reconfiguration similar to that described in relation to step 328 can also be initiated upon command. For example, a system reconfiguration command can be initiated by an authorized system manager at a communication system management console, such as network manager console 230. Such a command can specify a particular T/R site $210_1, 210_2, \ldots 210_N$ which is to assume responsibility for the control point function as described herein. Alternatively, the command can initiate a DCPA session similar to that described in relation to steps 322-328 in FIG. 3. Such a command will cause the communication system to select an optimum T/R site as the new control point in accordance with a control point arbitration algorithm. In either scenario, the network manager is provided with the ability to cause a different T/R site to be designated as the control point. It will be appreciated that the authorized system manager at a network manager console 230 would also have the ability to cause a T/R site to enter into a bypass mode, or to be excluded entirely from the operation of the communication system. Similarly, the network manager will have the ability to cause the communication system to revert to a previous state (e.g. a default configuration) in which a particular T/R site is functioning as the control point.

The communication system 200 can also be configured to allow the network manager to preplan and determine which sites are suitable to handle control point functions. These settings can be established using the network manager console 230. By electing T/R sites in this way, the network manager can command the system to only make use of a certain subset of the plurality of T/R sites for purposes of selecting a new control point. The list of suitable T/R sites specified by the network manger can be stored in a memory location at the T/R site available to the site controller 211. Similarly, the system manager can establish an order of preference in which T/R sites are selected in a DCPA session, or can set a preference weighting for each T/R site which may be considered among other factors (e.g. fault condition) for purposes of automatically arbitrating or selecting a T/R site to become the control point. This weighting information can also be stored at each T/R site so that it is accessible to the site controller 211. The weighting information can be a numerical value, or any other means suitable for specifying a degree of preference for using a particular T/R site as the control point.

The network manager console can be used to establish other system settings controlling the operation of the communication system 200. For example, a network manager using the network manager console 230 can establish logical rules to determine the conditions under which a particular T/R site will enter into a bypass mode and when the T/R site will execute a DCPA session. In the event that a T/R site does enter into a bypass mode (e.g. due to lost RF channels or other equipment failures) then the rules established by the network manager can also determine certain time limits. The time limits can establish for a T/R site that has entered into a bypass mode, a maximum time which can elapse before the particular T/R site will initiate a DCPA session.

One or more of the steps described in FIG. 3 can be performed by one or more of the site controllers 211 which are respectively provided in the T/R sites 210₁, 210₂, . . . 210ₙ. Those skilled in the art will appreciate that a site controller 211 can be realized in one computer system or in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

While the computer-readable storage medium 410 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Figure 4:
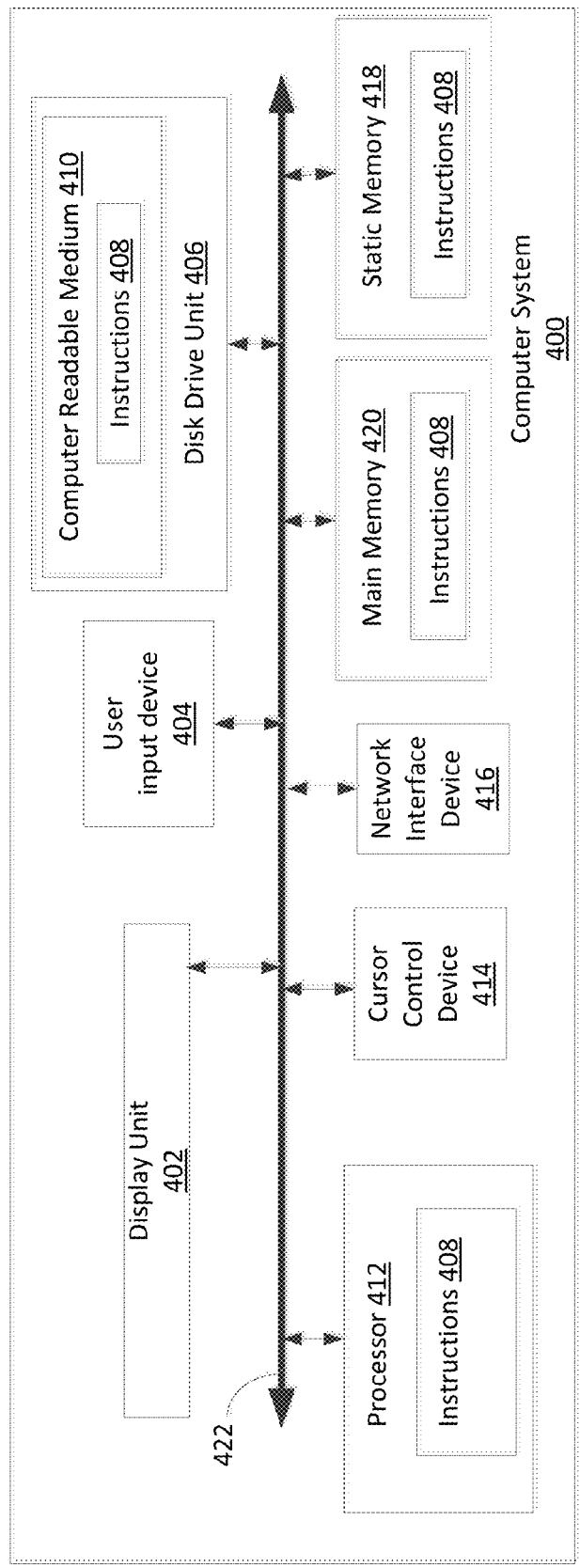
FIG. 4 is a block diagram of a computer system that is useful for understanding the invention.

Referring now to FIG. 4, there is shown a computer processing facility 400 which can be used for the site controller 211. A similar computer system can also be used to implement the functions dispatch console 204. The computer processing facility 400 includes a processor 412 (such as a central processing unit (CPU), a disk drive unit 406, a main memory 420 and a static memory 418, which communicate with each other via a bus 422. The computer processing facility 400 can further include a display unit 402, such as a video display (e.g., a liquid crystal display or LCD), a flat panel, a solid state display, or a cathode ray tube (CRT)). The computer processing facility 400 can include a user input device 404 (e.g., a keyboard), a cursor control device 414 (e.g., a mouse) and a network interface device 416.

The disk drive unit 406 includes a computer-readable storage medium 410 on which is stored one or more sets of instructions 408 (e.g., software code) configured to implement one or more of the methodologies, procedures, or functions described herein. The instructions 408 can also reside, completely or at least partially, within the main memory 420, the static memory 418, and/or within the processor 412 during execution thereof by the computer system. The main memory 420 and the processor 412 also can constitute machine-readable media.

Those skilled in the art will appreciate that the computer system architecture illustrated in FIG. 4 is one possible example of a computer system that can be used to implement the site controller 211. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations. Furthermore, software implementations can include, but are not limited to, distributed processing, component/object distributed processing, parallel processing, virtual machine processing, which can also be constructed to implement the methods described herein.

In the exemplary embodiment of the invention shown in FIG. 2, the control point functions will be performed by processing facilities available within the T/R site. For example, it has been noted that a processing facility at each T/R site designated as site controller 211 can perform these functions. The use of such processing facilities available at a T/R site is a significant advantage because it reduces the amount of supported equipment and sites necessary to implement the communication system 200. These design advantages are achieved while also increasing system redundancy and availability of key hardware components. Still, it should be appreciated that the control point processing performed by a T/R site need not be handled by the site controller 211, but can instead be handled by other processing facilities which are made available at a T/R site. For example, in some embodiments the site controller functions described herein are performed by one or more of the trunking controllers 216. Alternatively, a separate dedicated processing facility could be provided at each T/R site in communication with the LAN switch 214. The dedicated processing facility could be a computing system similar to computer processing facility 400. In such a scenario the dedicated processing facility would be primarily responsible for handling control point functions as described herein. Such an arrangement would achieve the important advantages described above. In such a scenario, the T/R site performing the control point functions could still be selected autonomously and dynamically in a DCPA session.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for operating a simulcast communication network, comprising:
communicating data from a first computer processing facility comprising a control point to a plurality of transmit/receive (T/R) sites;
synchronously transmitting said data from each of said plurality of T/R sites on a common RF frequency;
responsive to a determination that said first computer processing facility has experienced at least one fault,
automatically selecting a second computer processing facility from among a plurality of alternative computer processing facilities in communication with said simulcast communication network, and
automatically re-configuring the simulcast communication network to use the second computer processing facility as said control point for simulcast communications in place of said first computer processing facility by at least modifying at said plurality of T/R sites a destination address to specify the second computer processing facility as a destination for data communications to be sent from said plurality of T/R sites.

2. The method according to claim 1, further comprising, subsequent to said reconfiguring, communicating data from said second computer processing facility to said plurality of transmit/receive (T/R) sites, and synchronously transmitting said data from each of said plurality of T/R sites on a common RF frequency.

3. The method according to claim 1, further comprising selecting said first computer processing facility to include one or more processing elements comprising a first one of said T/R sites.

4. The method according to claim 3, further comprising integrating each of said plurality of alternative computer processing facilities respectively at a respective one of said plurality of T/R sites.

5. The method according to claim 4, wherein said first computer processing facility and said plurality of alternative computer processing facilities each include at least one shared functional component with the respective T/R site where they are located.

6. The method according to claim 1, wherein said process of automatically selecting said second computer processing facility comprises a dynamic control point arbitration session (DCPA) in which said plurality of said T/R sites perform collaborative actions to select the second computer processing facility.

7. A method for operating a simulcast communication network, comprising:
communicating data from a first computer processing facility comprising a control point to a plurality of transmit/receive (T/R) sites, and synchronously transmitting said data from each of said plurality of T/R sites on a common RF frequency;
responsive to a determination that said first computer processing facility has experienced at least one fault, automatically selecting a second computer processing facility from among a plurality of alternative computer processing facilities in communication with said simulcast communication network; and
automatically re-configuring the simulcast communication network to use the second computer processing facilities as said control point for simulcast communications in place of said first computer processing facility;
wherein said automatic reconfiguring further comprises modifying at said plurality of T/R sites a destination address specified for data packets communicated from said plurality of T/R sites.

8. The method according to claim 7, wherein said destination address before said modifying specifies a network address associated with said first T/R site and after said modifying specifies a network address associated with said second T/R site.

9. A method for operating a simulcast communication network, comprising:
communicating common transmission data from a first transmit/receive (T/R) site functioning as a control point to a plurality of second T/R sites;
synchronously transmitting said common transmission data from each of said first T/R site and said plurality of second T/R sites on a same RF frequency;
responsive to a determination that said first T/R site has experienced at least one fault, automatically selecting a first T/R site from among said plurality of second T/R sites to function as said control point in place of said first T/R site; and automatically re-configuring the simulcast communication network to use the selected one of said plurality of second T/R sites as said control point in place of said first T/R site by at least modifying at said plurality of second T/R sites a destination address to specify the second computer processing facility as a destination for data communications to be sent from said plurality of second T/R sites.

10. A method for operating a simulcast communication network, comprising:
communicating common transmission data from a first transmit/receive (T/R) site functioning as a control point to a plurality of second T/R sites, and synchronously transmitting said common transmission data from each of said first T/R site and said plurality of second T/R sites on a same RF frequency;
responsive to a determination that said first T/R site has experienced at least one fault, automatically selecting one among said plurality of second T/R sites to function as said control point in place of said first T/R site;
automatically re-configuring the simulcast communication network to use the selected one of said plurality of second T/R sites as said control point in place of said first T/R site; and
selectively bypassing said first T/R site to exclude it from participation in a simulcast communication session involving said simulcast communication network.

11. The method according to claim 10, further comprising performing said bypassing for a period of time prior to said automatic re-configuring.

12. The method according to claim 9, wherein said automatically selecting from among said plurality of second T/R sites comprises a dynamic control point arbitration session (DCPA) in which said plurality of second T/R sites perform collaborative actions to determine a particular T/R site which is selected.

13. A method for operating a simulcast communication network, comprising:
communicating common transmission data from a first transmit/receive (T/R) site functioning as a control point to a plurality of second T/R sites, and synchronously transmitting said common transmission data from each of said first T/R site and said plurality of second T/R sites on a same RF frequency;
responsive to a determination that said first T/R site has experienced at least one fault, automatically selecting one among said plurality of second T/R sites to function as said control point in place of said first T/R site; and
automatically re-configuring the simulcast communication network to use the selected one of said plurality of second T/R sites as said control point in place of said first T/R site;
wherein said automatically reconfiguring further comprises modifying at said plurality of second T/R sites a destination address specified for data packets communicated from said plurality of second T/R sites.

14. The method according to claim 13, wherein said destination address before said modifying specifies a network address associated with said first T/R site and after said modifying specifies a network address associated with said one among the plurality of second T/R sites.

15. A simulcast communication network, comprising:
a first transmit/receive (T/R) site configured to function as a control point which receives data from a plurality of sources and communicates common transmission data to a plurality of second T/R sites;
at least one RF transmitter system respectively provided at each of said first T/R site and at each of said plurality of second T/R sites, each said RF transmitter configured to synchronously transmit said common transmission data on a same RF frequency;
at least one processing device communicatively coupled to said simulcast communication network, said at least one processing device responsive to a determination that said first T/R site has experienced at least one fault and configured to initiate a dynamic control point arbitration session which includes:
automatically selecting a T/R site from among said plurality of second T/R sites to function as said control point in place of said first T/R site;
initiating an automatic re-configuring of the simulcast communication network to cause the T/R site which has been selected from said plurality of second T/R sites to function as said control point in place of said first T/R site; and
modifying at said plurality of second T/R sites a destination address to specify the T/R site which was previously selected therefrom as a destination for data communications to be sent from said plurality of second T/R sites.

16. The simulcast communication network according to claim 15, wherein said at least one processing device includes processing devices in two or more of said plurality of second T/R sites.

17. The simulcast communication network according to claim 16, wherein said two or more processing devices in said plurality of second T/R sites are configured to participate in a collaborative dynamic control point arbitration (DCPA) session to select said second T/R site which will function as control point.

18. A simulcast communication network, comprising:
a first transmit/receive (T/R) site configured to function as a control point which receives data from a plurality of sources and communicates common transmission data to a plurality of second T/R sites;
at least one RF transmitter system respectively provided at each of said first T/R site and at each of said plurality of second T/R sites, each said RF transmitter configured to synchronously transmit said common transmission data on a same RF frequency;
at least one processing device communicatively coupled to said simulcast communication network, said at least one processing device responsive to a determination that said first T/R site has experienced at least one fault and configured to initiate a dynamic control point arbitration session which includes:
automatically selecting one among said plurality of second T/R sites to function as said control point in place of said first T/R site; and
initiating an automatic re-configuring of the simulcast communication network to cause the one of said plurality of second T/R sites which has been selected to function as said control point in place of said first T/R site;
wherein said plurality of second T/R sites are responsive to said initiating to modify a destination address specified for data packets communicated from said plurality of second T/R sites.

19. The simulcast communication network according to claim 18, wherein said destination address before said modifying specifies a network address associated with said first T/R site and after said modifying includes specifying a network address associated with said one of said plurality of second T/R sites which has been selected as control point.

* * * * *